United States Patent [19]

Konaga et al.

[11] Patent Number: 5,549,371
[45] Date of Patent: Aug. 27, 1996

[54] BRAKING FORCE CONTROLLER AND CONTROL METHOD FOR ELECTRIC CAR

[75] Inventors: Naoji Konaga, Nishio; Mitsuo Inagaki, Okazaki; Hironori Asa, Okazaki; Toshitaka Tanahashi, Okazaki, all of Japan

[73] Assignees: Nippondenso Co., Ltd., Kariya; Nippon Soken, Inc., Aichi, both of Japan

[21] Appl. No.: 383,768

[22] Filed: Feb. 3, 1995

[30] Foreign Application Priority Data

Feb. 9, 1994 [JP] Japan ................................. 6-036488

[51] Int. Cl.$^6$ .............................. B60T 13/74; B60L 7/10
[52] U.S. Cl. ........................... 303/152; 303/3; 303/112; 188/181 T; 188/158
[58] Field of Search ............................ 188/181 T, 156, 188/158, 159; 303/112, 3, 152; 180/165, 65.1, 65.3, 65.8, 197; 364/426.01, 426.02, 426.03; 318/371, 376; 477/188, 203

[56] References Cited

U.S. PATENT DOCUMENTS

| 4,962,969 | 10/1990 | Davis | 303/152 |
| 5,318,355 | 6/1994 | Asanuma et al. | 188/156 |
| 5,358,317 | 10/1994 | Cikanek | 303/152 |
| 5,381,337 | 1/1995 | Burgess | 303/112 |
| 5,409,302 | 4/1995 | Chabbert | 303/112 |

FOREIGN PATENT DOCUMENTS

| 48-2515 | 1/1973 | Japan . |
| 5-2501 | 1/1993 | Japan . |
| 5270387 | 10/1993 | Japan . |
| 5270385 | 10/1993 | Japan . |

Primary Examiner—Douglas C. Butler
Attorney, Agent, or Firm—Cushman, Darby & Cushman

[57] ABSTRACT

In order to keep the braking torque of a motor always maximal and to execute suitable ABS regenerative braking, a controller of an electric car has a motor (1) connected to the road wheels, and its central controller confirms that regenerative energy calculated from output signals from an ammeter (51) and from a volt meter (52) after the braking operation begins reaches a maximum value, and stores a braking torque calculation value obtained from a signal from a motor number-of-revolution sensor (63), as a maximum braking torque value. When the difference between the braking torque command value applied to the motor (1) and the braking torque calculation value exists within a predetermined range, the braking torque command value is thereafter increased or decreased in accordance with the difference between the maximum braking torque value described above and a present braking torque calculation value, and when the difference is out of this predetermined range, the braking torque command value is decreased.

7 Claims, 7 Drawing Sheets

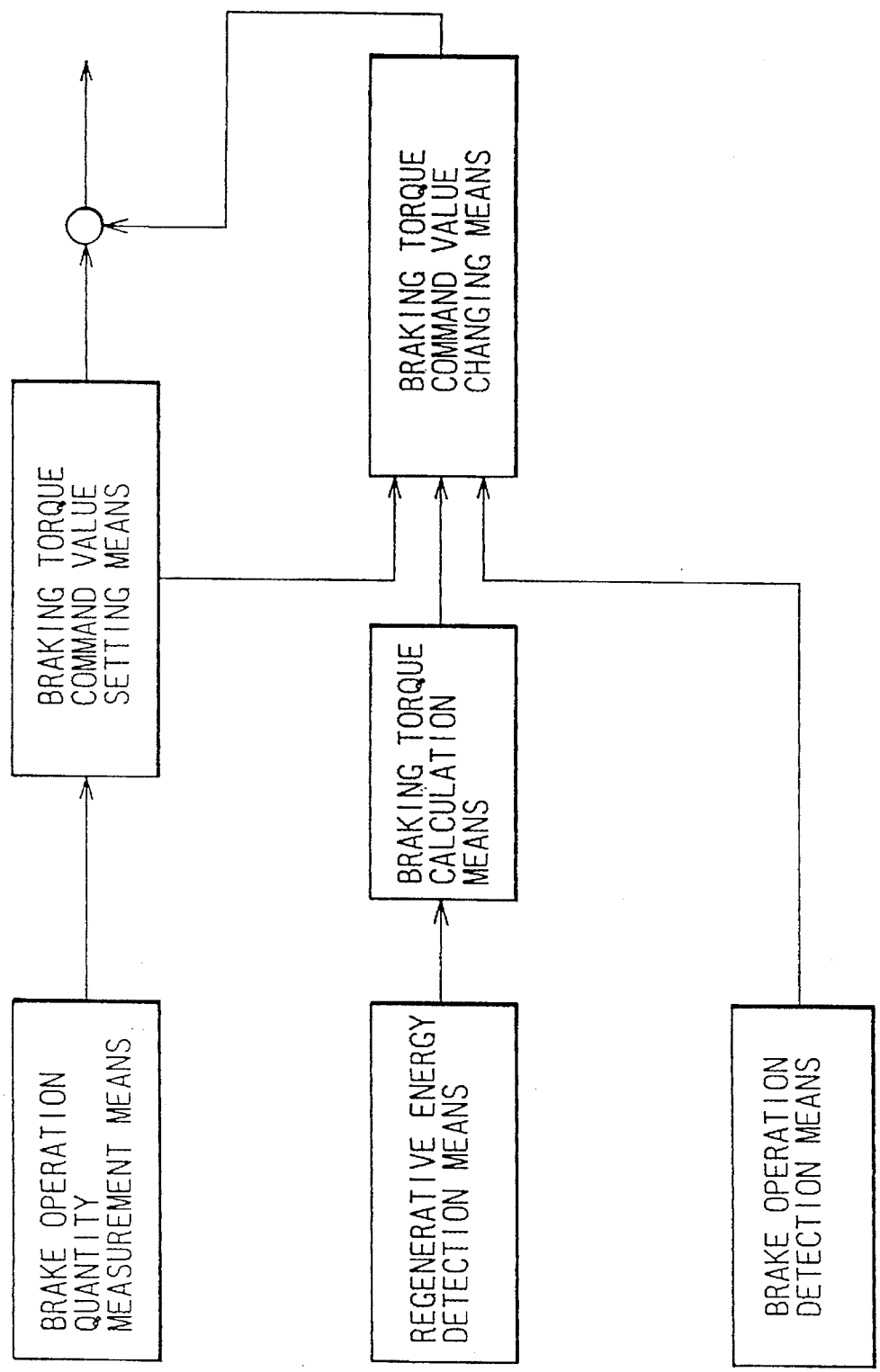

BRAKING FORCE CONTROLLER AND CONTROL METHOD FOR ELECTRIC CAR

BACKGROUND OF THE INVENTION

1. Field of the Invention

This invention relates to a braking force controller for an electric car. More particularly, it relates to a braking force controller which utilizes the regenerative braking force from a motor mounted in the electric car.

2. Description of the Related Art

When an ABS (Anti-lock Braking System) is practiced in electric cars, it may be possible, in principle, to separately mount an ABS apparatus on a hydraulic brake, of a type similar to that used in ordinary cars, and to stop regenerative braking, using a motor, during the ABS operation. However, according to such an arrangement, energy regeneration to a battery at the time of braking, which constitutes an important feature of electric cars, is not carried out.

Accordingly, various ABSs using regenerative braking by the mounted motor have been attempted, and Japanese Unexamined Patent Publication (Kokai) No. 48-2515, for example, discloses a system for accomplishing anti-lock braking by detecting the speed of the driving wheels, estimating the car speed, and thus the slip ratio, from the wheel speed and controlling the regenerative braking force (first prior art example). Japanese Unexamined Utility Model Publication (Kokai) No. 5-2501 discloses a system for controlling the regenerative braking force by calculating the slip ratio from the difference between the number of revolutions between the driven wheels and non driven wheels (second prior art example).

According to the first prior art example described above, however, it is difficult to accurately estimate the car speed from only the wheel speed, and there is a natural limit to regenerative braking at the suitable slip ratio (approximately 0.2) at which road surface friction becomes maximal. According to the second prior art example, on the other hand, the wheel speed of the follower wheels does not correctly correspond to the car speed when the mechanical braking force on the follower wheels is great, and regenerative braking at the suitable slip ratio is difficult, as well.

In order to solve these problems with the prior art, the present invention is directed to providing a braking force controller for an electric car which can produce suitable ABS regenerative braking by keeping the braking torque of a motor at a maximum.

SUMMARY OF THE INVENTION

A typical structure of the present invention will be explained with reference to FIG. 7. In an electric car having a motor connected to the driving wheels, a braking force controller according to the present invention comprises means for detecting regenerative energy of the motor, means for calculating a braking torque from the regenerative energy so detected, means for detecting a braking operation, means for measuring a braking operation quantity, means for setting a braking torque command value in accordance with the braking operation quantity, and a braking torque command value changing means for confirming that the regenerative torque so detected is at a maximum value after the braking operation is made, storing the braking torque calculation value at this time as a maximum braking torque value, thereafter increasing or decreasing the braking torque command value in accordance with the difference between the maximum braking torque value and a present braking torque calculation value when the difference between the braking torque command value and the braking torque calculation value exists within a predetermined range, and decreasing the braking torque command value when the difference described above is outside the predetermined range described above.

In another construction of the present invention, the braking torque command value changing means is further set so as to store the braking torque calculation value as the maximum braking torque value when the difference between the braking torque command value and the braking torque calculation value is outside the predetermined range.

In the construction described above, the braking torque command value is set in accordance with the brake operation quantity at the time of the normal braking operation when the motor is braked. When a hard brake is applied, the regenerative energy from the motor becomes larger with an increase in the braking torque command value, but when a large slip starts to occur at the driving wheels, regenerative energy peaks at the maximum value and then decreases. The braking torque is calculated from this maximum value of the regenerative energy, and is stored as the maximum braking torque value. Thereafter, the braking torque command value is increased or decreased in accordance with the difference between the maximum braking torque value and the present braking torque calculation value. In this way, the braking torque of the motor is always kept at a substantially maximum value and a satisfactory braking condition can be maintained.

Such a construction is particularly effective when the driving road surface changes from a high μ road to a low μ road during the braking operation. In other words, when the road surface shifts to the low μ road and the braking torque calculation value decreases, the difference from the braking torque command value is outside a predetermined range and the braking torque command value is rapidly decreased. When the difference between the braking torque calculation value and the braking torque command value falls again within the predetermined range described above, the braking torque command value is again forcibly increased or decreased in accordance with the difference between the maximum braking torque value and the present braking torque calculation value. When regenerative energy on the low μ road exhibits the maximum value during this process, the braking torque calculation value at this time is stored as the maximum braking torque value, and the braking torque command value is thereafter changed in such a manner as to accomplish this maximum braking torque value. In the manner described above, the regenerative braking force is maintained at the maximum value even when the road surface shifts to the low μ road.

Often the maximum value of regenerative energy does not appear when the road surface shifts to the low μ road. To cope with such a case, in another construction of the present invention, when the road surface shifts to the low μ road, the braking torque calculation value decreases and, consequently, the difference from the braking torque command value is outside the predetermined range, the braking torque calculation value at this time is stored as the maximum torque value, and the braking torque command value is thereafter changed in such a manner as to accomplish this maximum braking torque value.

BRIEF DESCRIPTION OF THE DRAWINGS

FIG. 7 is a block diagram illustrating a braking force controller in accordance with the principles of the present invention.

DESCRIPTION OF THE PREFERRED EMBODIMENTS

Figure 1:
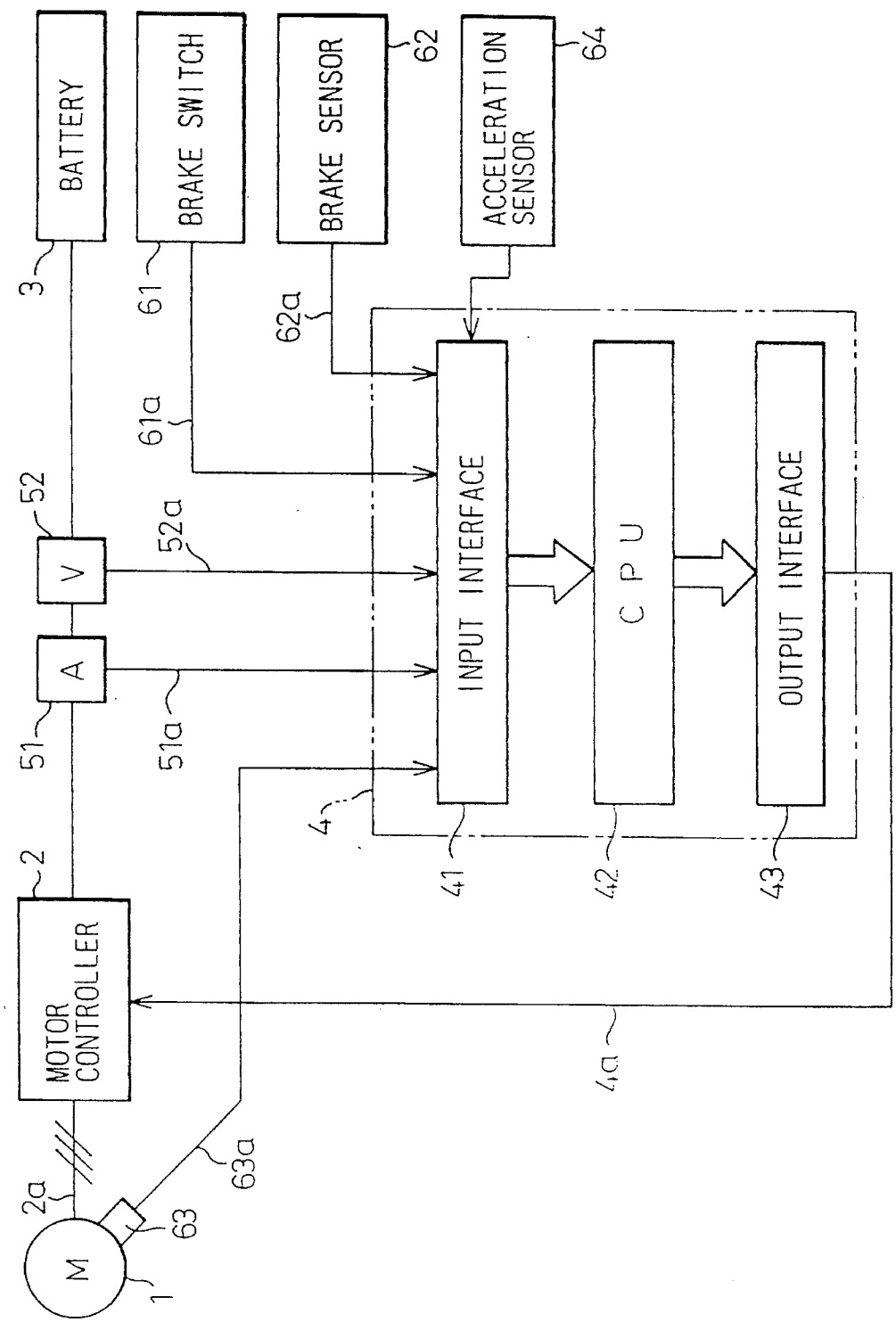
FIG. 1 is a block structural view of a braking force controller according to an embodiment of the present invention.

FIG. 1 of the accompanying drawings shows a driving system of an electric car which incorporates a braking force controller according to the present invention. A motor 1 for driving the rotation of driving wheels is a three-phase induction motor, and is connected to a motor controller 2. The motor controller 2 acquires D.C. power from a battery 3 and applies a three-phase driving signal 2a having a predetermined frequency to the motor 1 on the basis of an output signal 4a from a central controller 4. The slip S of the motor 1 is given by the formula ①. Accordingly driving force control is applied when S>0 and braking force control when S<0.

$$S=(f0-f)/f0 \qquad (①)$$

where f0 is a frequency of the driving signal and f is the rotating frequency of the motor.

An ammeter 51 and a volt meter 52 are interposed in a power supply line extending from the motor controller 2 to the battery 3, and their output signals 51a and 52a are inputted to an input interface 41 of the central controller 4. A signal 61a from a brake switch 61 which operates at the time of a brake operation, a signal 62a from a brake sensor 62 which generates an output corresponding to the operation quantity of the brake, and a signal 63a from a motor number-of-revolution sensor 63 are inputted to the input interface 41. Further, an acceleration sensor 64 is connected to the input interface 41, and the motor 1 is controlled by known control means so that the number of revolutions of the motor 1 becomes large when the acceleration pedal is operated and the brake operation is small.

Next, the relation between the braking torque T and regenerative energy P of the motor 1 will be explained prior to the explanation of the control sequence in a CPU 42.

Figure 2:
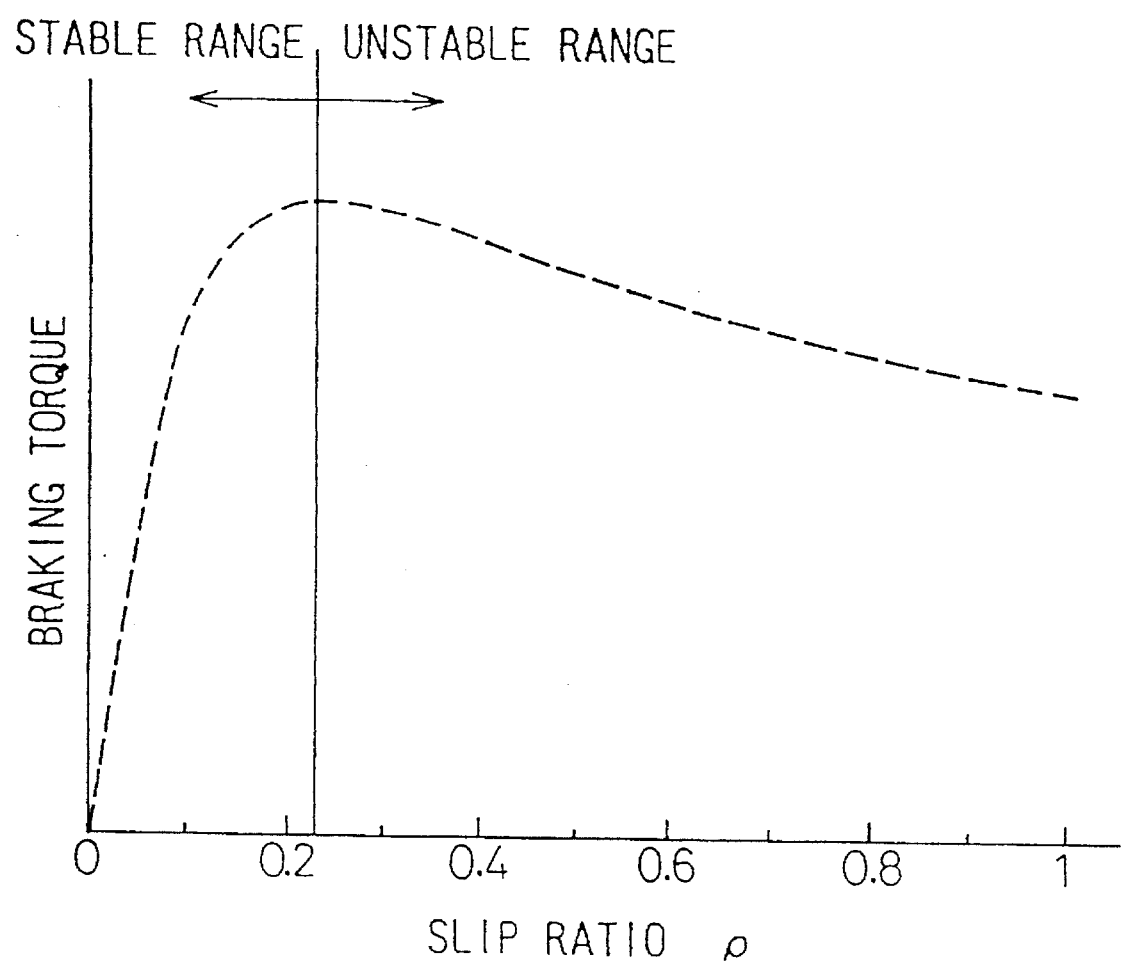
FIG. 2 is a graph showing the relation between a slip ratio and a braking torque.

It is known in the art that the slip ratio ρ of the tire and its braking torque T have the relation such as the one shown in FIG. 2. The range of the slip ratio ρ of from 0 to about 0.2 is a stable range where the braking torque T, too, increases with the increase of the slip ratio ρ, and after the braking torque T reaches maximum around the slip ratio ρ of around 0.2, the braking torque T enters an unstable range where it becomes smaller with an increase of the slip ratio ρ. Accordingly, braking control is preferably effected in the stable range, and a braking distance can be made short by limiting the slip ratio ρ to about 0.2 and keeping the braking torque T at a high level during a hard brake. This is the known concept of ABS.

Figure 3:
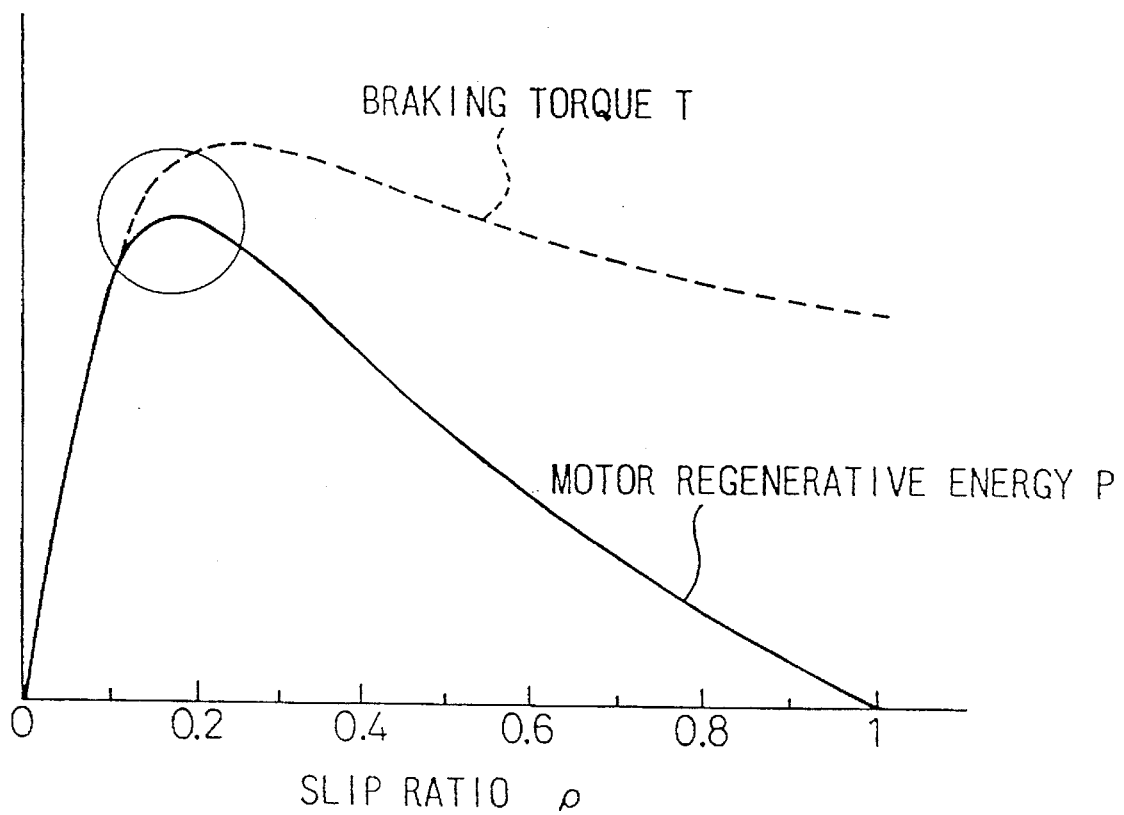
FIG. 3 is a graph showing the relation between a braking torque with respect to a slip ratio and motor regenerative energy.

As the braking operation starts and the motor is driven from the road surface side, the motor function changes to the generator function and energy P is generated. As is known in the art, the regenerative energy P reaches maximum inside the stable range and immediately before the point at which the braking torque T is maximal, as shown in FIG. 3. In other words, when slip starts to occur, the regenerative energy drops.

Accordingly, the braking torque T always takes a large value inside the stable range and ABS can be accomplished when the regenerative braking operation is effected in such a fashion that regenerative energy P becomes maximal during the regenerative braking control operation of the motor 1.

Regenerative energy P can be given by the following formula ② where IB is a regenerative current and VB is a regenerative voltage:

$$P=IB \cdot VB \qquad (②)$$

The braking torque T is given by the following formula ③:

$$T = \frac{\mu \cdot P - \frac{\partial}{\partial t}\left\{ \frac{1}{2} \cdot I \cdot \left(2\pi \cdot \frac{N}{60}\right)^2 \right\}}{2\pi \cdot \frac{N}{60} \cdot \frac{1}{\gamma}} \qquad (③)$$

where μ is efficiency, I is an inertia, γ is a reduction ratio and N is the number of revolutions of the motor.

Accordingly, when regenerative energy P is measured, the braking torque (hereinafter also called the "braking torque calculation value") T can be known.

Accordingly, the CPU 42 calculates the actual braking torque T from regenerative energy P of the motor in accordance with the following sequence on the basis of the input signals 51a to 62a described above, determines a braking torque command value, and generates an output signal 4a and applies it to the motor controller 2 through an output interface 43 so as to attain this braking torque command value.

Figure 4:
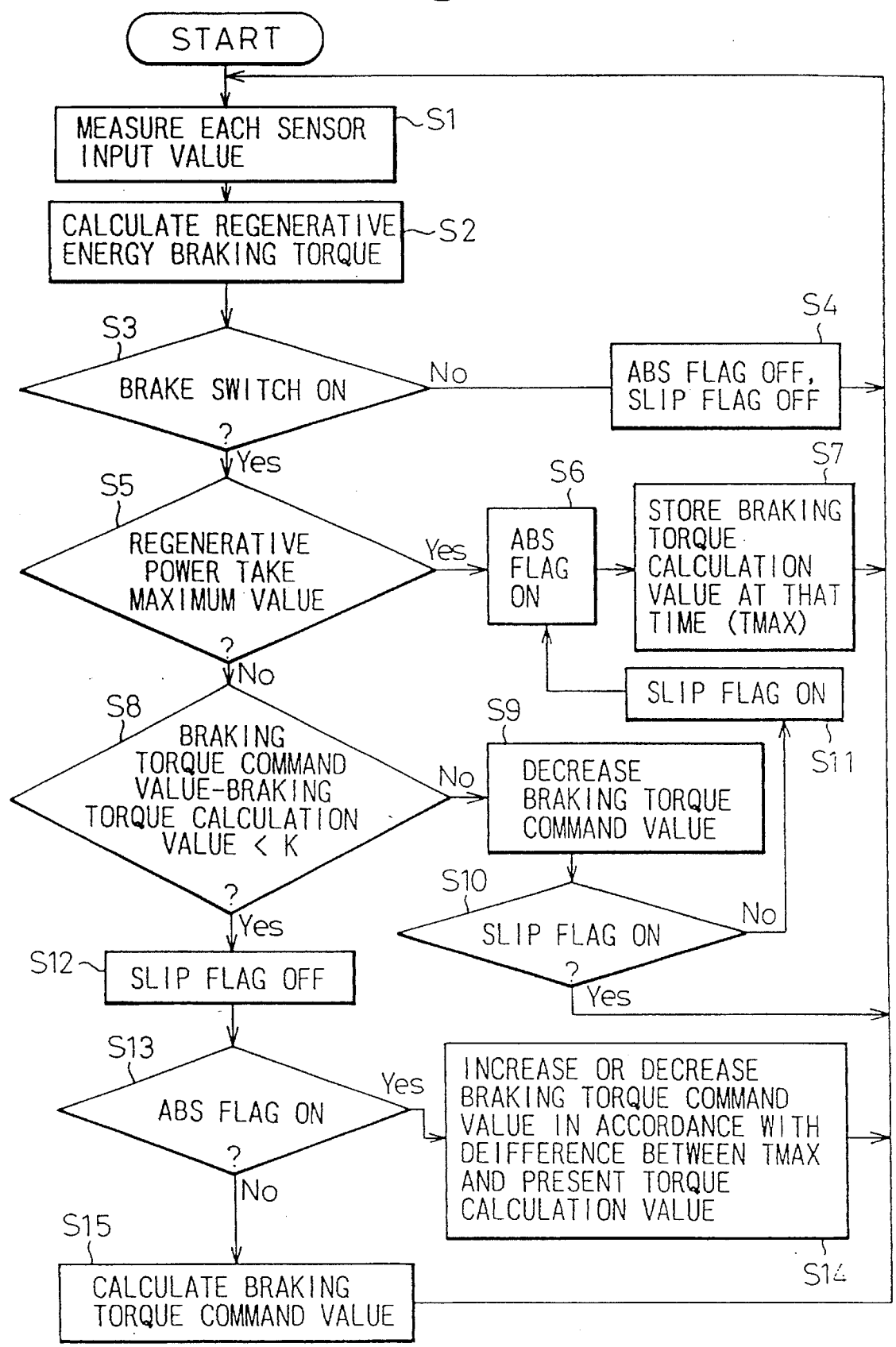
FIG. 4 is a flowchart of a motor control.

FIG. 4 shows the control sequence of the CPU 42 described above. The output signals 51a, 52a and 63 of the ammeter 51, the volt meter 52 and the motor number-of-revolution sensor 63 are inputted at a step (hereinafter called merely "S") S1, and regenerative energy P and the braking torque calculation value T are calculated on the basis of these signals in accordance with the formulas ② and ③ at S2.

When confirmation is made at S3 that the brake switch 61 is ON and the braking operation is effected, whether or not regenerative energy P becomes maximal is judged at S5. This confirmation of the maximum value is made by checking whether the energy value shifts from rising to falling.

Figure 5:
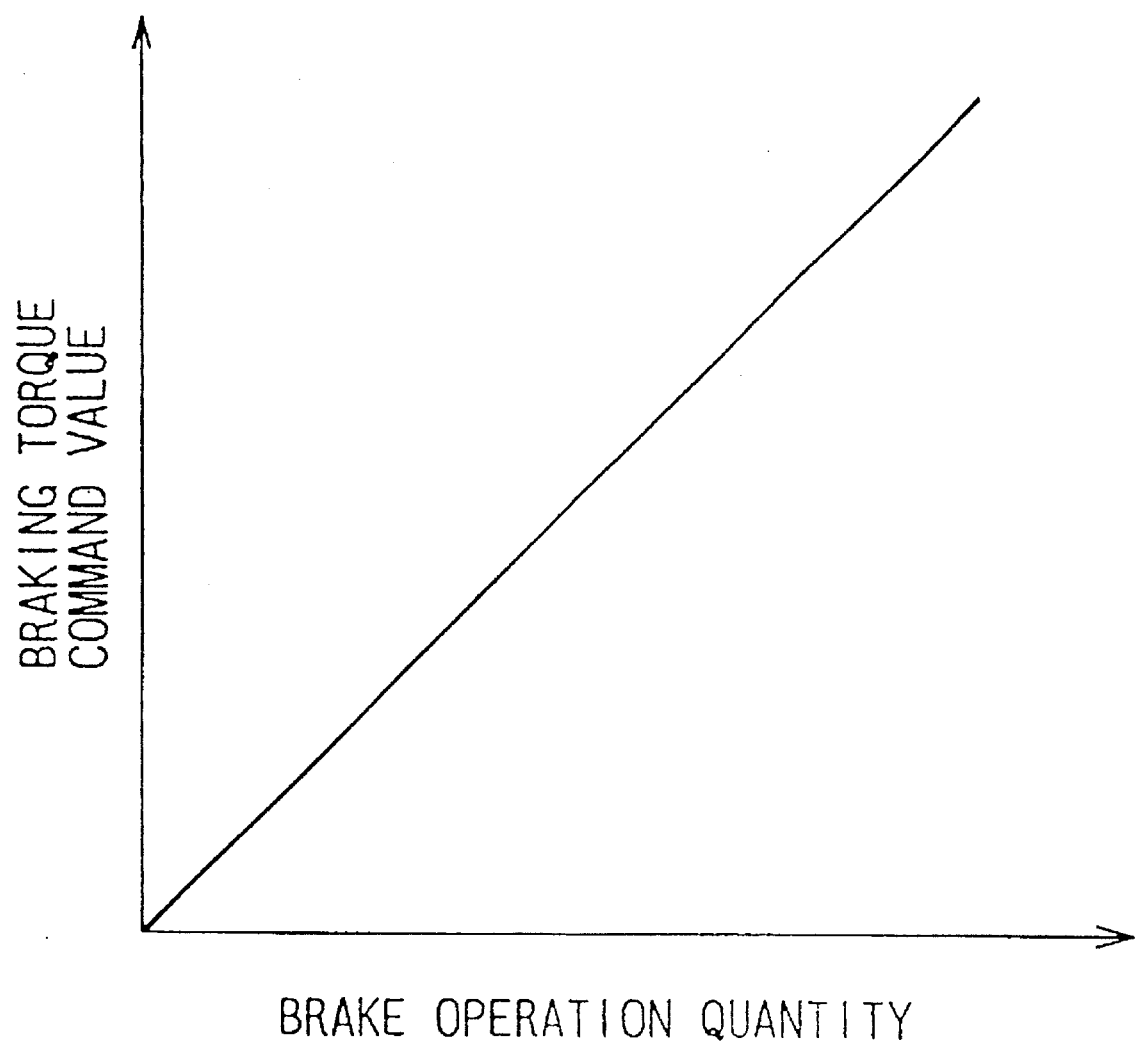
FIG. 5 is a graph showing the change of a braking torque command value with respect to a brake operation quantity.

When regenerative energy P does not take the maximum value, whether or not the braking torque calculation value exists within a predetermined range K (constant) with respect to the braking torque command value is confirmed, that is, whether or not the command value is greater by a certain value than the calculation value is judged (S8), and then whether or not an ABS flag is turned ON is judged (S13) by turning OFF a SLIP flag (S12). When it is not turned ON, the braking torque command value is calculated at S15. This braking torque command value is determined as a value proportional to the braking operation quantity as shown in FIG. 5.

Figure 6:
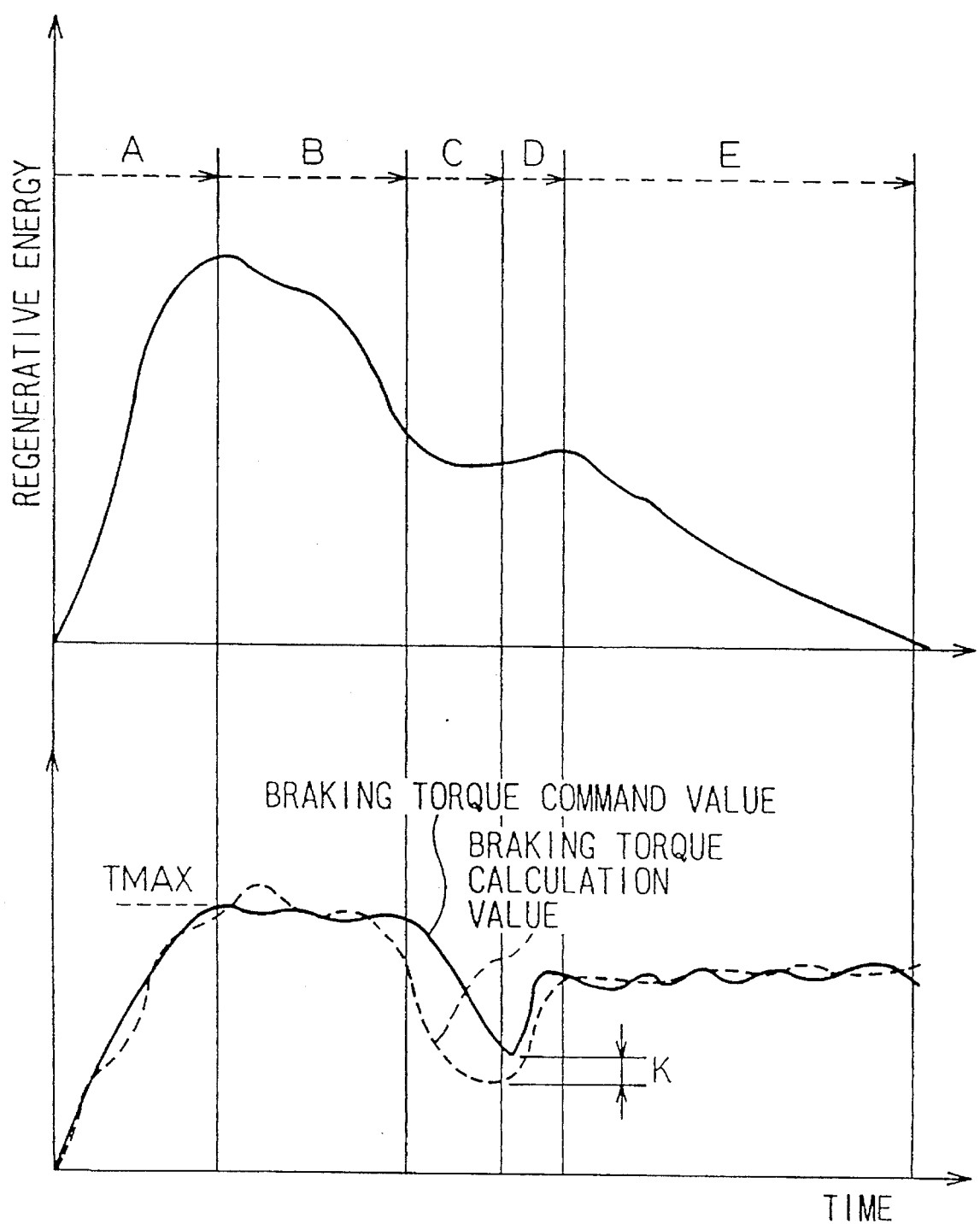
FIG. 6 is a time chart at the time of the operation of the controller.

This is the state where the driving wheels do not yet undergo much slip after the braking operation and the slip is inside the safe zone corresponding to a range A shown in FIG. 6. Consequently, the braking torque command value rises in accordance with the operation quantity of the brake, and both regenerative energy and the braking torque calculation value increase.

Regenerative energy takes the maximum value before the point at which the driving wheels start slipping, and drops thereafter. This drop is confirmed at S5 in FIG. 4 and the ABS flag is turned ON (S6). The ABS control is then started and the braking torque calculation value (refer to S2) at this time is stored as the maximum braking torque TMAX (S7).

After regenerative energy once takes its maximum value, the flow proceeds to S8, and whether or not the difference between the braking torque command value and the calculation value falls within the constant range K is judged. If the difference exists within the constant range K, the flow proceeds from S12 to S14 because the ABS flag is turned ON at S13 (because ABS control is started). The braking torque command value is increased or decreased in accordance with the difference between the maximum braking torque TMAX (refer to S7) and the present torque calculation value, and the braking torque calculation value is kept substantially near the maximum braking torque TMAX. This corresponds to the B range shown in FIG. 6.

When the driving road surface changes from a high μ road to a low μ road under this condition, the braking torque calculation value greatly drops as shown in the C range in FIG. 6 in accordance with the aforementioned formula ③. Therefore, judgment at S8 shown in FIG. 4 becomes NO, the braking torque command value is decreased at S9, the SLIP flag is turned ON at S11, and the braking torque calculation value at this time (that is, immediately after the slip) is stored as the maximum braking torque TMAX at S7. As the steps S8, S9 and S10 are repeatedly executed, the braking torque command value is caused to gradually drop.

When the braking torque command value so decreased falls within the predetermined range K with respect to the calculation value, the flow proceeds from S8 to S12 and S14, and the braking torque command value is increased or decreased (increase only, in this case) in accordance with the difference between the maximum braking torque TMAX and the present torque calculation value. This is shown in the D range in FIG. 6.

When regenerative energy exhibits the maximum value on this low μ road, the flow proceeds to the steps S5, S6 and S7, and the braking torque calculation value at this time is updated and stored as the maximum braking torque TMAX. Thereafter, the flow proceeds to the steps S8, S12, S13 and S14, and the braking torque command value is increased or decreased in accordance with the difference between the maximum braking torque TMAX described above and the present torque calculation value. Thereafter, the braking torque calculation value is kept near the maximum value on the low μ road. This is shown in the E range in FIG. 6.

In this way, the regenerative braking force at the time of the hard braking operation is kept maximal with respect to the driving road surface, and the maximum regenerative braking force on a new low μ road is kept even when the driving road surface changes from the high μ road to the low μ road.

Even when the regenerative energy does not exhibit the maximum value on the low μ road, the driving control does not greatly deviate because the braking torque calculation value immediately after the slip after the shift of the road surfaces is stored as the maximum braking torque TMAX as described above.

A motor other than the three-phase induction motor, such as a synchronous motor may be used as the motor 1. These motors can be controlled as both a motor and a generator by an electric circuit inside the motor controller 2 such as by an inverter. In other words, when the motor is controlled as the motor and the outputs of the electric circuit (voltage, current, frequency, phase, etc.) to the motor are changed during driving of the electric car, the motor function changes to the generator function due to kinetic energy of the electric car itself which runs due to the inertia, and the generator generates regenerative energy to charge the battery 3. The magnitude of this regenerative energy and running energy of the motor can be freely controlled by detecting the acceleration and brake pedal operations by the sensors 62 and 64, and such a control has become a known technology. In the three-phase induction motor, for example, the synchronous speed of the revolving field can be changed by changing the three-phase outputs of the inverter to control the slip quantity, and regenerative energy can be generated during driving as the motor. In this way, the braking operation can be applied to the electric car. This brake becomes great when regenerative energy is generated, and when it is excessively great, slip occurs between the wheels of the electric car and the road surface.

Accordingly, the necessity for controlling regenerative energy so as to insure a satisfactory braking operation arises. In the electric car of this kind, the braking operation is detected by the brake sensor 62 and the braking torque command value is computed by a computer inside the central controller 4 in accordance with the detection output.

In this embodiment, the existence of slip is determined at the step S8, and when slip starts occurring, the braking torque command value is decreased at the step S9. When slip does not exist, the difference between the maximum braking torque calculation value, which is so calculated as to apply the maximum braking force, and the braking torque calculation value (the control torque estimated from regenerative energy at the step S2) is checked, and the braking torque command value is increased or decreased so as to reduce this difference. In other words, when the maximum braking torque calculation value is greater, the output signal 4a is generated from the output interface 43 to the motor controller 2 so that the braking torque command value becomes great and regenerative energy becomes high.

The braking force in the present invention may be applied not only by an electrical brake for generating regenerative energy but it may also be applied by an ordinary mechanical brake. Although the present invention has been discussed with reference to the preferred embodiment, it will be appreciated by those skilled in the art that various substitutions and modifications can be made without departing from the spirit and scope of the invention as set forth in the appended claims.

We claim:

1. A braking force controller for an electric car having a motor connected to driving wheels, which generates a braking force in accordance with a braking torque command value, comprising:

regenerative energy detection means for detecting regenerative energy produced by the motor;

calculation means for calculating a braking torque calculation value from at least the regenerative energy so detected;

operation detection means for detecting an operation of a brake;

measurement means for measuring a brake operation quantity;

setting means for setting the braking torque command value in accordance with the brake operation quantity; and braking torque command value changing means for determining when the detected regenerative energy reaches a maximum value, storing the braking torque calculation value associated with the maximum value of the detected regenerative energy as a maximum braking torque value, increasing or decreasing the braking torque command value so as to reduce a difference between the maximum braking torque value and the braking torque calculation value when the braking torque command value is within a predetermined range of the braking torque calculation value, and decreasing the braking torque command value when the braking torque command value exceeds the predetermined range of the braking torque calculation value.

2. A braking force controller for an electric car according to claim 1, wherein the braking torque command value changing means stores the braking torque calculation value as the maximum braking torque value when the braking torque command value exceeds the predetermined range of the braking torque calculation value.

3. A braking force controller for an electric car in which a motor is driven by power from a battery, causing the electric car to run by a frictional force with a road surface, and in which the battery is electrically charged by regenerative energy obtained by operating the motor as a generator during braking, the braking force controller comprising:

regenerative energy detection means for detecting regenerative energy produced when the motor charges the battery;

calculation means for calculating a braking torque calculation value from at least the regenerative energy so detected;

measurement means for measuring an operation quantity of a brake;

arithmetic means for calculating a braking torque command value in accordance with at least the brake operation quantity so measured;

maximum value detection means for detecting when the detected regenerative energy reaches a maximum value;

memory means for storing the braking torque calculation value calculated when the regenerative energy reaches the maximum value, as a maximum braking torque value; and braking force control means for controlling the magnitude of a braking force so that the braking torque calculation value is maintained within a predetermined range of the maximum braking torque value.

4. A braking force controller for an electric car according to claim 3, wherein the braking force control means judges that a slip occurs between the electric car and the road surface and decreases the magnitude of the braking force when the braking torque command value exceeds the braking torque calculation value by at least a predetermined value.

5. A braking force controller for an electric car according to claim 4, wherein the braking force control means controls the braking force by increasing and decreasing at least the regenerative energy.

6. A braking force controller for an electric car according to claim 5, wherein the braking force control means controls the braking force by increasing and decreasing at least the braking torque command value.

7. A method for controlling a braking force of an electric car in which a motor is driven by power from a battery to run the electric car, and in which the motor is operated as a generator during braking to electrically charge the battery by regenerative energy, the method comprising the steps of:

calculating a magnitude of regenerative energy produced by the motor according to a regenerative current flowing from the motor to the battery and a corresponding regenerative voltage;

calculating a braking torque of the electric car according to at least the magnitude of regenerative energy so calculated, and storing the calculated braking torque as a braking torque calculation value;

judging whether or not the magnitude of regenerative energy has reached a maximum value;

calculating a braking torque command value on the basis of a brake operation quantity of the electric car;

judging that slipping is occurring when the regenerative energy has reached the maximum value, and when the braking torque command value exceeds the braking torque calculation value by at least a predetermined quantity;

generating an anti-lock brake system operation command when the regenerative energy has reached the maximum value;

storing the braking torque calculation value as a maximum braking torque value when the anti-lock brake system operation command is generated;

decreasing the braking torque command value when slipping is occurring; and increasing or decreasing the braking torque command value to maintain the braking torque calculation value within a predetermined range of the maximum braking torque value when slipping is not occurring and when the anti-lock brake system operation command is generated.

* * * * *